United States Patent [19]

Bray

[11] 4,001,663
[45] Jan. 4, 1977

[54] SWITCHING REGULATOR POWER SUPPLY
[75] Inventor: William Edward Bray, Houston, Tex.
[73] Assignee: Texas Instruments Incorporated, Dallas, Tex.
[22] Filed: Sept. 3, 1974
[21] Appl. No.: 502,703
[52] U.S. Cl. .................................. 321/2; 323/17; 323/DIG. 1; 323/21
[51] Int. Cl.² ................... G05F 1/64; H02P 13/24
[58] Field of Search ........ 323/17, 21, 22 T, DIG. 1, 323/34, 35, 36, 38; 321/2, 18; 307/237, 238, 239, 296, 297; 340/189 R

[56] References Cited
UNITED STATES PATENTS

| | | | |
|---|---|---|---|
| 3,629,686 | 12/1971 | Hendrikus et al. | 323/DIG. 1 |
| 3,675,158 | 7/1972 | Judd et al. | 323/22 T X |
| 3,701,937 | 10/1972 | Combs | 321/2 |
| 3,733,540 | 5/1973 | Hawkins | 323/22 T X |
| 3,737,756 | 6/1973 | Hasley et al. | 323/DIG. 1 |
| 3,764,889 | 10/1973 | Nowell | 323/17 |
| 3,771,040 | 11/1973 | Fletcher | 321/2 |

Primary Examiner—Gerald Goldberg
Attorney, Agent, or Firm—Harold Levine; Rene' E. Grossman; Thomas G. Devine

[57] ABSTRACT

A switching regulator power supply operates at a high frequency with a low loss, light weight ferrite core transformer. The transformer primary is selectively connected across a DC source of rectified AC power for a predetermined time to provide energy storage followed by a predetermined time period of disconnect to provide energy transfer by way of transformer flyback. The energy storage and energy transfer cycles are initiated by a novel, self-starting timing circuit. The power parameters in at least one of a plurality of secondary windings are sensed and compared with a reference standard. Any error, in the form of a pulse-width-modulated pulse is coupled back to a primary control for adjustment of the energy storage time period. The coupling is done through a sealed opto-electronic coupler, this providing a DC coupling.

39 Claims, 7 Drawing Figures

SWITCHING REGULATOR POWER SUPPLY

BACKGROUND OF THE INVENTION

1. Field of the Invention

This invention pertains to power supplies for connection to readily available power sources such as 60 Hz, 110 or 220 volts. More specifically, it relates to a switching regulator power supply utilizing DC coupling circuitry from secondary to primary and from primary to secondary, and utilizes a ferrite core transformer.

2. Description of the Prior Art

Power supplies typically utilize laminated cores in transformers used to obtain the working voltage or voltages desired. This is accomplished by directly transforming the 60 Hz input voltage. Power supplies utilizing such transformers can be designed to operate quite satisfactorily, but have the disadvantage of large bulk and weight which cannot readily be tolerated for some applications. Associated circuitry, such as filter capacitors, also must be large. To reduce size and weight, unregulated secondary inverters have been provided to supply power. These devices are difficult to regulate. Secondary regulators are typically used, causing a reduction in circuit efficiency and a more expensive power supply.

The switching regulator power supply provides high efficiency and low cost. It commonly incorporates a transformer wound on a ferrite core wherein an energy storage period is used to store energy in the transformer primary and an energy transfer period is used to transfer energy from the primary to the secondary of the transformer when the primary circuit is opened. The basic switching regulator power supply monitors electrical parameters in the primary circuit, having an AC coupling only through the transformer to the secondary circuit. Often, a small 60 Hz transformer must be used to assure that the power supply will work upon application of line voltage.

A more advanced switching regulator power supply utilizes a transformer coupled feedback circuit from the secondary circuit to the primary circuit. This permits monitoring secondary power parameters and adjusting the energy storage cycle accordingly, to a degree of accuracy not achievable when the primary circuit only is monitored as in the case of the basic switching regulator power supply.

The switching regulator power supply herein described and claimed utilizes a DC coupling technique from secondary to primary and from primary to secondary in the form of optical coupling devices. Use of optical coupling techniques provide for enormously increased reliability by way of permitting comparatively sophisticated testing during manufacture and before installation. The optical coupling allows isolation of primary and secondary circuits which is not achievable where transformers are used for such coupling. Therefore, when the manufacturing and testing stage is completed in the case of the optically coupled units, the possibility of providing a user with a working power supply is greatly enhanced. Through the use of optical coupling, a light, small, switching regulator power supply is available.

BRIEF SUMMARY OF THE INVENTION

A switching regulator power supply utilizes a single transformer, wound on a ferrite core. The power supply is adapted to be connected to a DC source of rectified, readily available AC source such as 60 Hz at 110 or 220 volts. The transformer is wound on a ferrite core with the primary being selectively connected across the rectified AC source for a predetermined time to provide energy storage. A power switching circuit is used to provide drive and continuity through the primary winding to each side of the AC rectified source. An energy transfer cycle follows in which the power switch is abruptly opened, permitting current to flow in the other direction when the field in the primary winding collapses. This is referred to as transformer flyback and at this time, an energy transfer cycle occurs for a predetermined time period. The secondary winding or windings contain rectifier diodes which permit current to flow in the desired direction only when the transformer flyback occurs.

The timing circuit is a clock that is positively self-starting when the power is applied. The clock is basically a DC coupled circuit, having only one AC coupled component, a capacitor whose charge rate controls one of the time periods.

One secondary winding of a plurality of secondary windings is monitored for secondary current and voltage amplitudes. A comparison is made and any error signal is transmitted in the form of a pulse-width-modulated pulse back to the primary through an optical coupling device to extend or shorten the energy storage cycle. Also, optical coupling circuitry is provided from the primary circuit to the secondary pulse-width-modulation circuitry.

The principal object of this invention, therefore, is to provide a light weight, compact, and reliable power supply for connection across a DC source of rectified, readily available AC power.

Another object of this invention is to provide a switching regulator power supply that has DC coupling between the primary and secondary circuits.

Still another object is to provide a switching regulator power supply having a novel DC coupled timing circuit that is positively self-starting.

Another object of this invention is to provide a switching regulator power supply that is capable of having circuit isolation for production testing.

Still a further object is to provide a switching regulator power supply that utilizes optical coupling for transferring signals from the secondary to the primary circuit and from the primary circuit to the secondary circuit to indicate circuit malfunction and/or an adjustment requirement.

Another object is to provide a switching regulator power supply having secondary regulation of a plurality of DC outputs, one of the outputs also providing load regulation.

These and other objects will be made evident in the Detailed Description that follows.

DETAILED DESCRIPTION OF THE INVENTION

General Description

Figure 1:
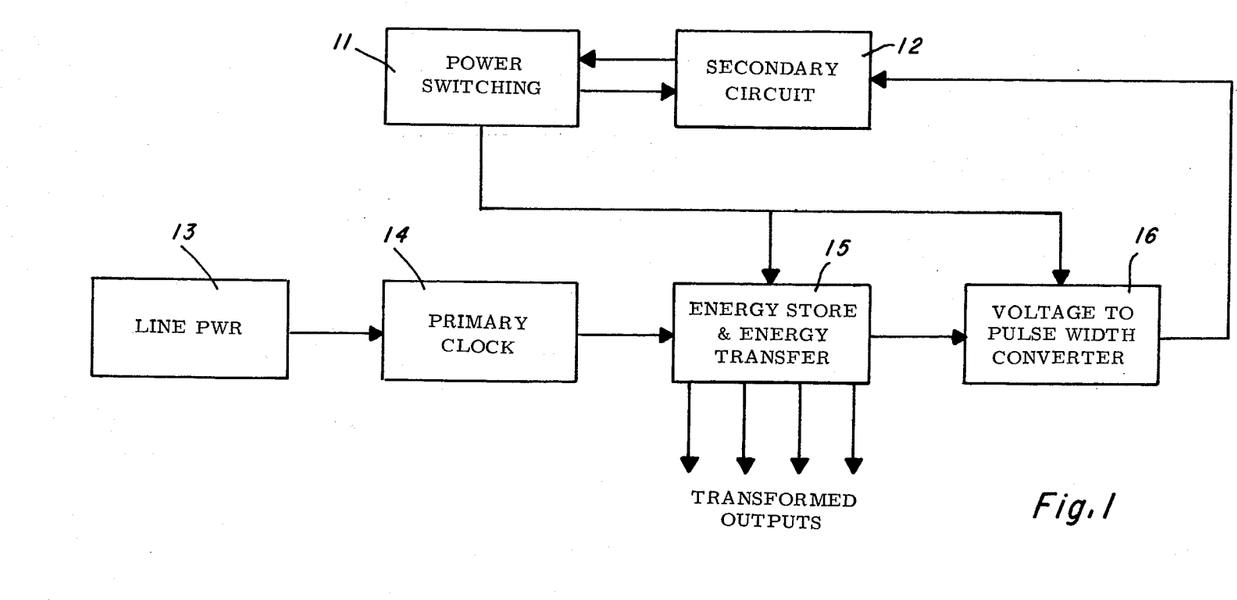
FIG. 1 is a block diagram of the principal parts of the switching regulator power supply of this invention.

FIG. 1 illustrates the switching regulator power supply 10 in block form. The soft-start circuit and the voltage doubling circuit labeled line power 13 activates the primary clock 14. The primary clock starts the energy store and energy transfer cycle 15 and the voltage to pulse width converter compares a secondary voltage with a reference and serves as an input to the secondary circuit transfer apparatus which transfers an "End Regulation cycle" (RCE) signal to the power switching circuit 11, which serves as an input to energy store and energy transfer 15 to end the energy storage cycle.

The Clock

Figure 2A:
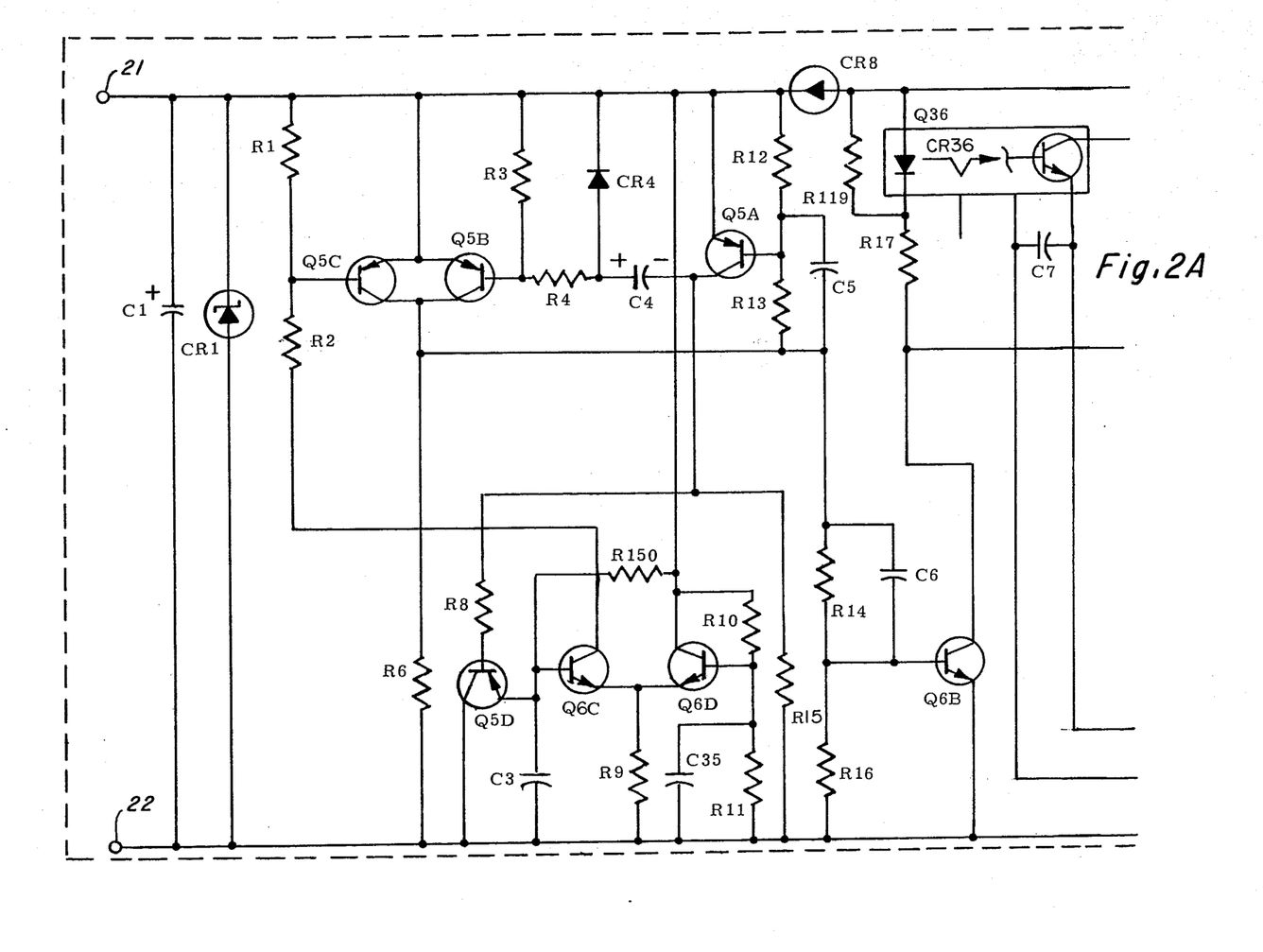
FIGS. 2A and 2B comprise a detailed schematic diagram of the clock, the optical coupling circuits, and the primary latch.
Figure 2B:
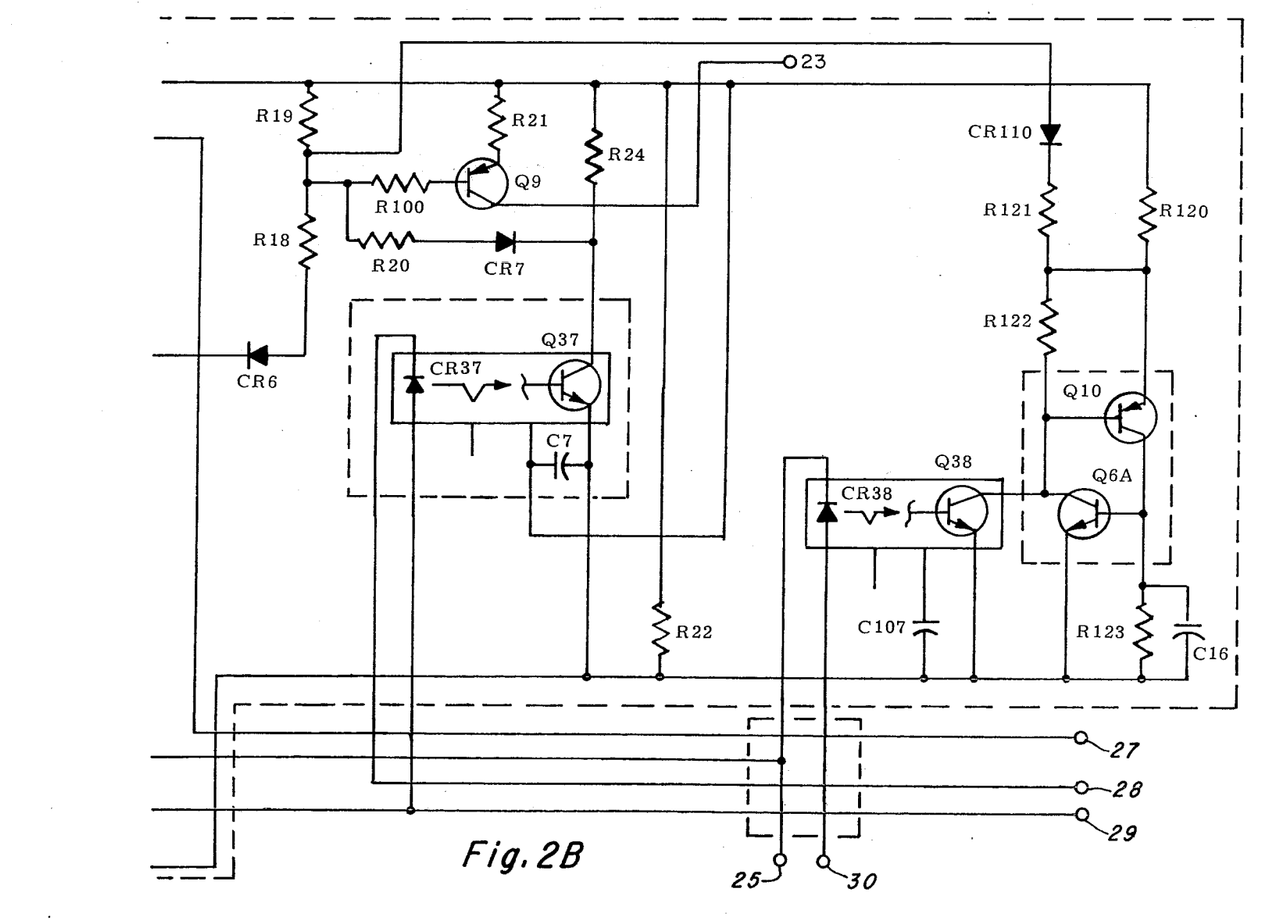

Referring now to FIG. 2, the timing circuitry is shown. A positive 300 volts is presented at terminal 21, and terminal 22 is connected to the collector of the power clock transistor Q4 of FIG. 3. Capacitor Cl and Zener diode CR1 are connected in parallel between terminals 21 and 22. Diode CR1 is reverse biased and serves as a voltage clamp to maintain a 10 volt differential between terminals 21 and 22. Transistors Q5C, Q5B and Q5A, together with their associated components, form a one-shot multivibrator. The emitters of transistor Q5C and Q5B are connected together to terminal 21 and their collectors are connected together, through resistor R6 to terminal 22. The collectors are also connected to the base of transistor Q5A through resistor R13. Capacitor C5 is connected in parallel with resistor R13, to the base of transistor Q5A at one terminal and to the collectors of Q5B and Q5C at the other terminal. The base of transistor Q5A is also connected through resistor R12 to terminal 21 and the emitter of that transistor is directly connected to terminal 21. The collector of transistor Q5A is connected to series timing capacitor C4, the other side of which is connected to the anode discharge diode CR4, whose cathode is connected to terminal 21 and through resistor R4 to the base of transistor Q5B, which is also connected to terminal 21 through resistor R3. The trigger for this one-shot multivibrator is provided by transistor Q6C whose collector is connected to the base of transistor Q5C through resistor R2, the base of transistor Q5C also being connected to terminal 21 through resistor R1.

The emitter of transistor Q6C is connected through resistor R9 to terminal 22 and is also connected to the emitter of transistor Q6D. The base of transistor Q6C is connected through resistor R150 to terminal 21, to the emitter of transistor Q5D to parallel timing capacitor C3, whose other terminal is tied to terminal 22. The collector of transistor Q6D is connected to terminal 21 and through resistor R10, connected to its base and finally through resistor R11 to terminal 22, the combination of resistors R11 and R10 forming a voltage divider for the differential pair, transistors Q6C and Q6D. Capacitor C35 is connected in parallel with resistor R11. The collector of transistor Q5D is connected to terminal 22, and the base is connected through resistor R8 to the collector of transistor Q5A, the collector of Q5A also being tied through resistor R15 to terminal 22. Capacitor C6 and resistor R14 are connected in parallel, one connection being made to the base of transistor Q6B and the other being made to the connection of the collectors of transistors Q5B and Q5C. The emitter of transistor Q6B is connected directly to terminal 22 and its base is connected also to terminal 22 through resistor R16. The collector of transistor Q6B is connected to the cathode of diode CR6, whose anode is connected to one end of resistor R18, the other end of resistor R18 being connected through resistor R100, to the base of transistor Q9, the output transistor of the clock circuit. The collector of Q6B is also connected through the series path of resistor R17 and resistor R119, to the anode of Zener diode CR8, whose cathode is connected to terminal 21. The emitter of transistor Q9 is connected through R21 to the anode of Zener diode CR8. The collector of transistor Q9 is connected to terminal 23, serving as the clock output. Biasing resistor R19 has one end connected to the anode of Zener diode CR8 and the other end connected to the junction of R18 and R100.

Figure 4A:
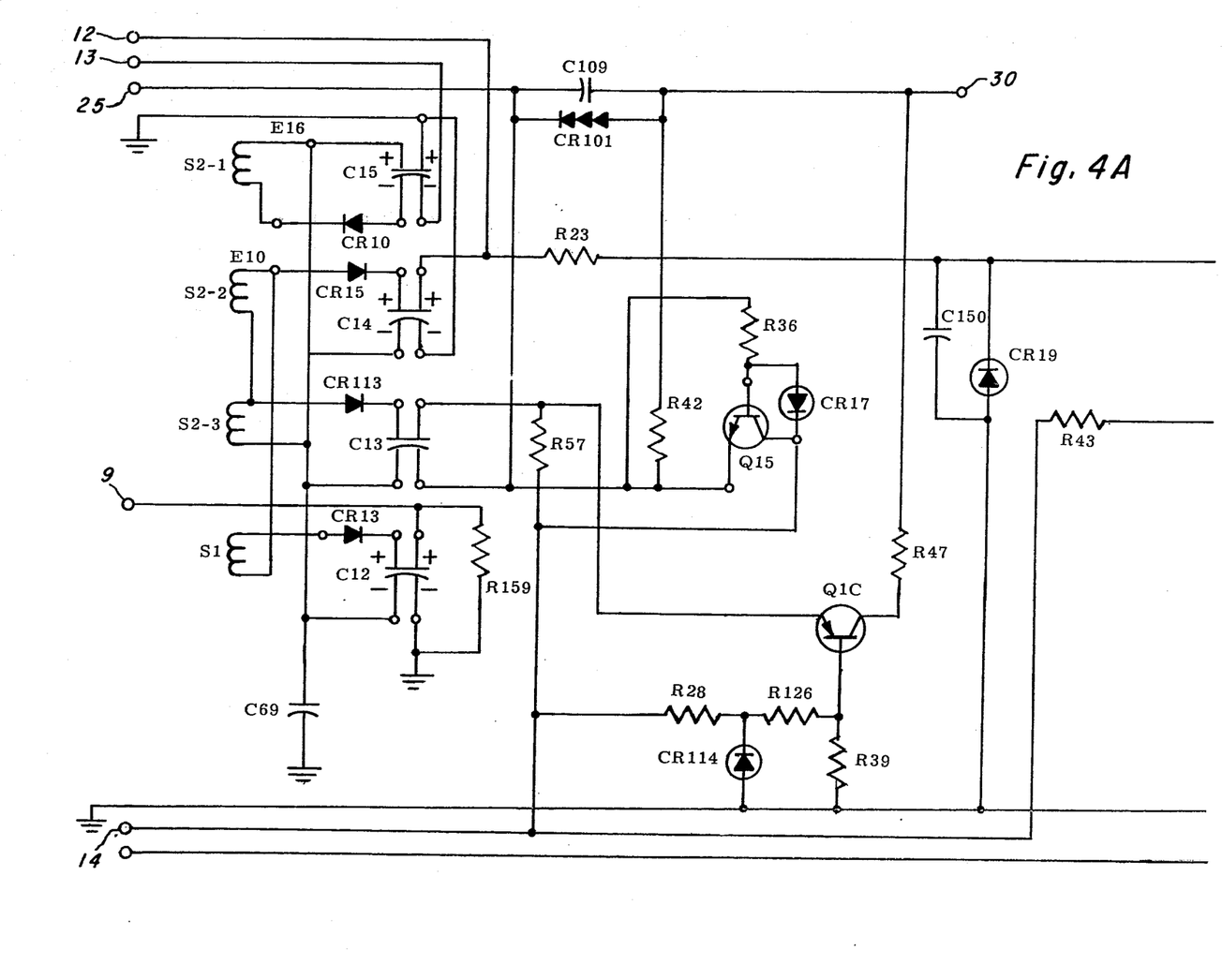
FIGS. 4A and 4B comprise a detailed schematic diagram of the secondary circuit including the protection circuits.
Figure 4B:
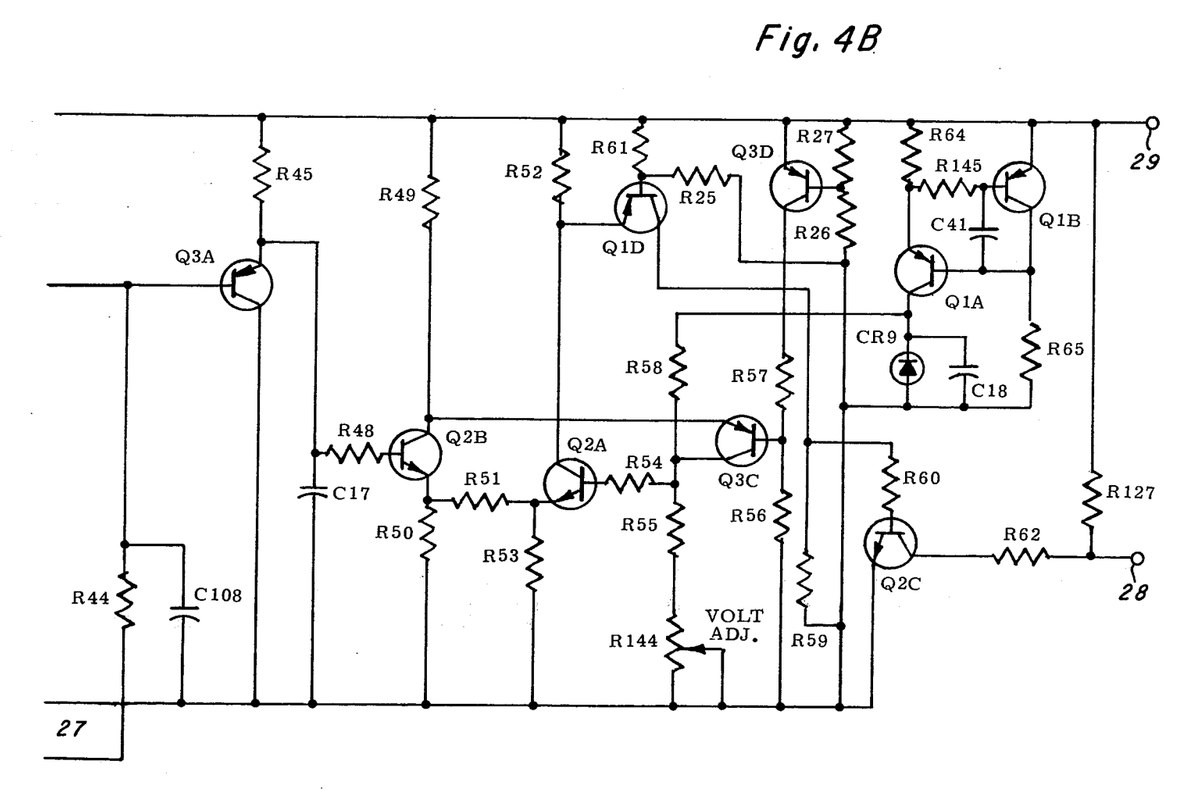

Light emitting diode CR36, together with phototransistor Q36 form an optical coupling device, whose purpose is to provide a signal to the secondary circuit, FIG. 4, indicating that a regulation cycle is starting. The anode of CR36 is connected to diode CR8 and its cathode is connected through resistor R17 to the collector of transistor Q6B. Phototransistor Q36 has its emitter connected to terminal 25 and its collector connected to terminal 27, both of which are connected to the secondary circuit shown in FIG. 4.

Preferred Mode of Operation of the Clock

When the rectified AC power is applied to the switching regulator power supply, the power clock transistor Q4 is turned on. The collector of transistor Q4 is tied to terminal 22, so that a current path through transistor Q4, and ultimately to ground, exists. Zener diode CR1 establishes a 10 volt differential between terminals 21 and 22. Transistor Q6C, upon application of this voltage, has an initial positive 10 volts on its base with respect to its emitter thereby turning on transistor Q6C. The time at which transistor Q6C turns on will be referred to as the beginning of a cycle. With transistor Q6C turned on, a path is completed from terminal 21 throuogh resistors R1 and R2, thereby establishing a voltage on the base of PNP transistor Q5C negative with respect to its emitter, thereby turning on transistor Q5C. The current flowing through transistor Q5C establishes voltage drop across resistor R6, which is connected to the collectors of transistors Q5C and Q5B, and also through R13 to the base of PNP transistor Q5A. This relatively positive voltage turns transistor Q5A off at the beginning of the cycle. Current flowing through resistors R3 and R4 begins charging capacitor C4. The charge on capacitor C4 tends to turn on transistor Q5B, the current flowing through that transistor also charging capacitor C4. After a specified time, dependent upon the values of components selected, C4 becomes charged to a point at which the voltage drop across resistor R3 drops below 0.6 volts, thus turning off transistor Q5B. Transistor Q5C had previously been turned off by virtue of losing the trigger signal from transistor Q6C. This occurred, because at the beginning of the cycle, transistor Q5A turned off, causing a negative-to-positive drop from base to emitter of PNP transistor Q5D, thus turning it on. With transistor Q5D turned on, the base to emitter potential of NPN transistor Q6C became negative, turning off that transistor. The period during which transistor Q5B is turned on and transistor Q5A is turned off is the period during which energy is transferred to the secondary windings of Transformer T1, 30 microseconds long in this preferred embodiment. The capacitor C4 discharges through diode CR4 back through transistor Q5A when it is turned on.

When transistor Q5A is turned on, the base of transistor Q5D goes positive, turning off that transistor. When transistor Q5D turns off, timing capacitor C3 begins to charge from the 300 volts supply at terminal 21 through resistor R150.

Capacitor C3 charges toward 5 volts and eventually turns on NPN transistor Q6C. As transistor Q6C begins to draw current, the voltage across resistor R1 rises past the 0.6 volts, turning on transistor Q5C and beginning the cycle again. The time during which capacitor C3 is charging and before transistor Q6C is turned on is the energy storage cycle, which is 10 microseconds long in this preferred embodiment. At this point, with transistor Q5D again turned on, capacitor C3 can rapidly discharge through that transistor.

During the energy transfer cycle, with the circuit completed from the +300 volts at terminal 21 through transistor Q5B and resistor R6, the voltage at the base of NPN transistor Q6B is positive with respect to the emitter, turning that transistor on. Then diode CR6 is forward biased, permitting current to flow through resistor R19 and resistor R18. This causes the base of PNP transistor Q9 to go negative with respect to its emitter, turning it on. Transistor Q9 being turned on causes the energy transfer cycle to occur. Transistor Q9 is turned off when transistor Q5B stops conducting as set out above, thereby turning off transistor Q6B. This occurs during the energy storage cycle.

The Power Switching Circuit

Figure 3:
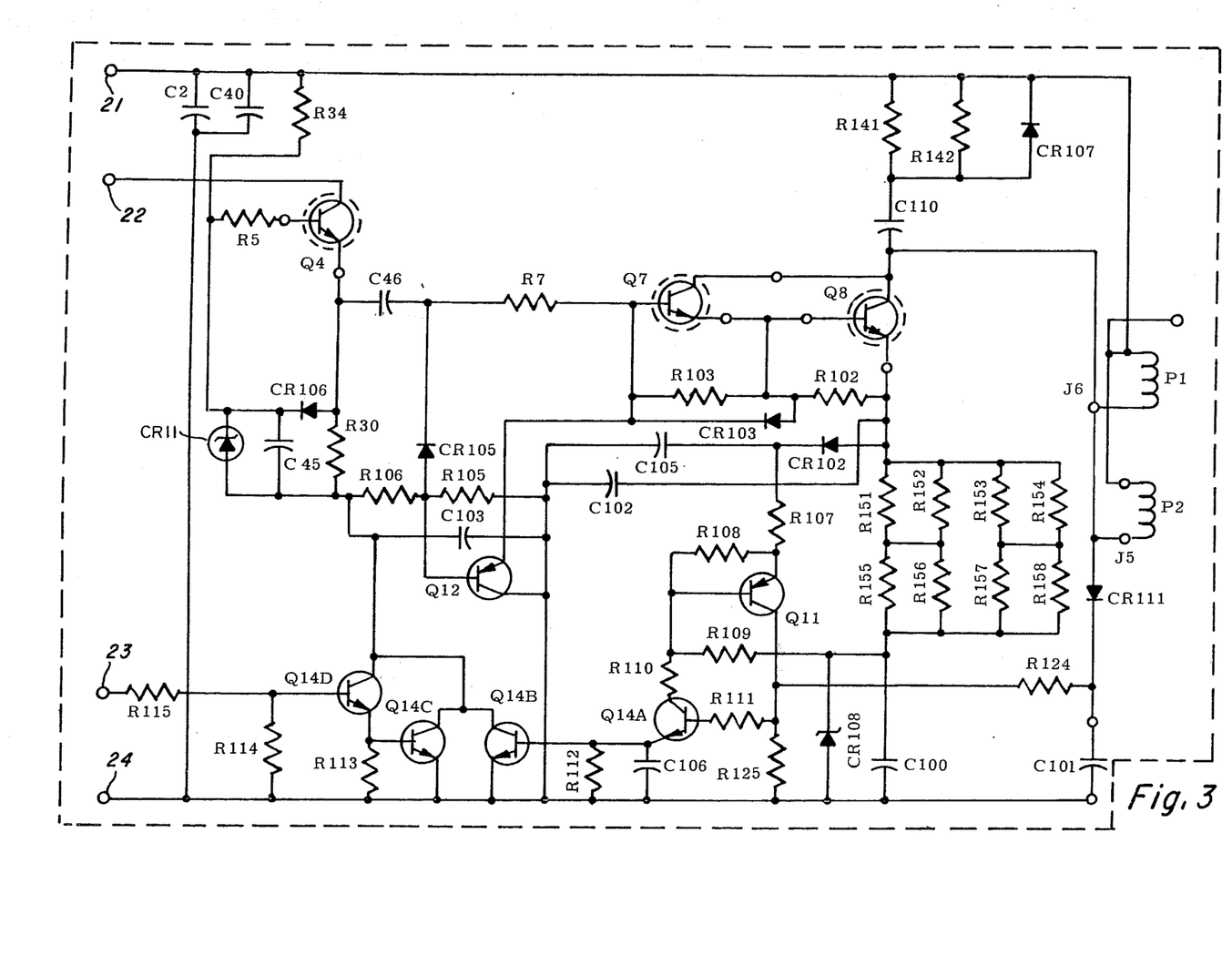
FIG. 3 is a detailed schematic of the power switching circuit.

The power switch and associated circuitry is shown in FIG. 3. A positive 300 volts is applied at terminal 21, and ground is applied at terminal 24. Capacitors C2 and C40 are connected in parallel across the input DC power between terminals 21 and 24. Power clock transistor Q4 has its collector connected to terminal 22 to initiate the clock cycle (see FIG. 2). The base of transistor Q4 is connected through resistor R5 to the cathodes of Zener diode CR11 and diode CR106 respectively, to one terminal of capacitor C45 and to one side of resistor R34, whose other end is tied to terminal 21, the 300 volt reference. The other terminal of C45 is tied to anode of Zener diode CR10 and to one end of resistor R30, whose other end is connected to the anode of diode CR106 and the emitter of transistor Q4.

Power driver transistor Q7 has its base connected to biasing resistor R7, the other end of which is connected to one terminal of coupling capacitor C46, the other terminal of C46 being connected to the emitter of transistor Q4. The base of transistor Q7 is also connected to the cathode of diode CR103 and to one end of biasing resistor R103, the other end of resistor R103 being tied to the anode of diode CR103, this junction being connected to the emitter of transistor Q7. Diode CR105 has its cathode connected to the junction between the one end of resistor R7 and the one terminal of capacitor 46, and has its anode connected to the junction between resistors R105 and R106. The other end of resistor R106 is tied to the anode of Zener diode CR11, to one terminal of capacitor C103 and to the collectors of transistors Q14B, Q14C, and Q14D respectively. The other end of resistor R105 is tied to capacitors C102 and C105 and to the other side of capacitor C103, to the collector of transistor Q12 and ground at terminal 24. The anode of CR105 is also connected to the base of transistor Q12 whose emitter is connected to the base of transistor Q7.

The power switch transistor Q8 has its base connected to the emitter of transistor Q7, its emitter tied to one end of resistor R102, to the other side of capacitor C102, and to the anode of diode CR102. The other end of resistor R102 is connected to the junction of resistor R103 and the anode of diode CR103. The cathode of diode CR102 is connected to one side of capacitor C105, whose other side is connected to ground. The collector of transistor Q8 is tied to terminals J6 and J5, J6 being tied to one side of the primary winding of the transformer P1 and to one side of the primary winding of the transformer, P2, with the other side of each of the primary windings being tied together and connected to the 300 volt source at terminal 21. The collector of transistor Q8 is also connected to the anode of diode CR111, whose cathode is connected to one side of flyback protect capacitor C101, whose other side is tied to ground at terminal 24. Resistor R124 is also part of the flyback protect circuit and is connected at one end to the one side of capacitor C101, and at the other end to the collector of transistor Q11.

The emitter of power switch transistor Q8 is also connected to a network of resistors R151-R158, specifically connected to one end of resistors R151, R152, R153, and R154. The other end of resistor R151 is connected to one end of resistor R155, to the other end of resistor R152 and to one end of resistor R156. The other end of resistor R153 is connected to one end of resistor R157 to the other end of resistor R154, and to one end of resistor R158. The other ends of resistors R155, R156, R157, and R158 are tied together and connected to the cathode of Zener diode CR108, one terminal of capacitor C100 to one end of resistor R109. This resistive network in the preferred embodiment is the equivalent of 0.5 ohms. The anode of Zener diode CR108 and the other terminal of capacitor C100 are tied to ground. The other side of resistor R109 is tied to the base of PNP transistor Q11 and, through resistor R108 to its emitter. Transistor Q11 is part of a primary current limit latch circuit. The emitter of transistor Q11 is connected through resistor R107 to the cathode of diode CR102 and to one terminal of capacitor C105. The collector of transistor Q11 is connected through resistor R125 to ground and through resistor R111 to the base of NPN transistor Q14A, also part of the latch circuit. The collector of transistor Q14A is connected throuoh resistor R110 to the base of transistor Q11. The emitter of transistor Q14A is connected through resistor R112 to ground to one terminal of capacitor C106 and to the base of NPN transistor Q14B, whose emitter is connected to ground. The emitter of NPN transistor Q14C is connected to ground, its base is connected to the emitter of NPN transistor Q14D and through resistor R113 to ground. The base of transistor Q14D is connected through resistor R114 to ground and to terminal 23, through resistor R115. Terminal 23 is connected to the collector of the primary clock transistor, Q9. The other terminal of capacitor C106 is tied to ground.

It should be pointed out that the primary windings P1 and P2 of transformer T1 are shown in schematically simple form for descriptive purposes only. In the preferred embodiment, the transformer T1 actually has two primary windings each having 48 turns and the secondary has eight windings with six turns each, a set of eight windings with two turns each, a set of 14 windings with two turns each, and one winding with four turns. The primary and secondary windings are thus wound together in a 1-to 1 ratio.

Preferred Mode of Operation of the Power Switching Circuit

With transistor Q9 (FIG. 2); turned on, and with its collector connected to terminal 23, the circuit is completed through resistors R115 and R114, causing a positive voltage to appear at the base of NPN transistor Q14D, turning that transistor on. When it is turned on, a positive base-to-emitter voltage occurs at NPN transistor Q14C, causing it also to conduct. With transistors Q14C and Q14D conducting, a current path is provided through transistor Q4 and resistor R30 through transistors Q14C and Q14D to ground at terminal 24. The potential difference across the series combination of resistors R106 and R105 is small, indeed close to zero volts. Transistors Q14C and Q14D continue conducting until transistor Q9 is turned off as described above. Upon that occurrence, the current flow through resistors R115 and R114 is interrupted, turning off transistor Q14D, which in turn cuts off transistor Q14C. With transistors Q14C and Q14D cut off, the conduction path through them to ground is, of course, incomplete and the potential difference across resistors R106 and R105 rises to approximately 35 volts in this preferred embodiment. This 35 volt increase is effectively presented to the base of power clock transistor Q4 through the Zener diode CR11. It should be pointed out that transistor Q4 is shown as a single transistor, but in the preferred embodiment is a Darlington pair, providing a much higher current gain than that of a single transistor. This change is reflected in the emitter circuit of transistor Q4 and is coupled through capacitor C46 and resistor R7 to the base of power driver transistor Q7, turning that transistor on. The current flow through resistors R102 and R103 turns on the power switch transistor Q8, which starts the energy storage cycle. This causes current to flow in the transformer primary windings P1 and P2. During the time that transistor Q8 is conducting, capacitors C100 and C110 are charging. Capacitor C110 is charged through resistors R141 and R142 to nearly 300 volts since the collector transistor Q8 drops to a potential slightly above the ground potential at terminal 24. The primary current rises linearly to an amplitude that is determined by the time when transistor Q8 is turned off.

If the current goes beyond a predetermined maximum amount, transistor Q11 is turned on. The network of resistors R151-R158, in the preferred embodimemnt, is equivalent to 0.5 ohms and when the current in the emitter circuit of Q8 rises to more than 7.4 amps, the resultant voltage drop across the network turns on diode CR102, causing a positive emitter-to-base voltage to occur at PNP transistor Q11, turning that transistor on. When transistor Q11 turns on, the base-to-emitter voltage of NPN transistor Q14A becomes positive, turning on that transistor. When transistor Q14A turns on, it supplies base current to transistor Q14B, which also turns on. With transistor Q14B conducting, the voltage drop across resistors R106 and R105 again drop to a very small amount, thereby ending the energy storage cycle. If the current limit is not exceeded, then the energy storage cycle continues until such time as transistor Q9 is turned on, completing the current path through R115 and R114, thereby turning on transistor Q14D. The voltage across resistors R106 and R105 drops to nearly zero, removing the base drive to transistor Q7.

A fast cut off of transistor Q8 is achieved by discharging capacitor C100, which was charged during the energy storage cycle, through the network R151-R158, through resistor R102, diode CR103 and transistor Q12 to ground, thereby providing a reverse bias current, dropping the base voltage of transistor Q8 well below its emitter voltage. The voltage charge on C100 cannot exceed the breakdown voltage of Zener diode CR108, which in the preferred embodiment is 5 volts, However, approximately 2 ½ amps of reverse bias current is provided, causing an abrupt cut off of transistor Q8.

Transistor Q7 is originally saturated and therefore cannot be turned off as fast as transistor Q8. The energy transfer cycle should not be started until both transistors Q7 and Q8 have been turned off. The network comprised of capacitor C100, resistors R141 and R142, and CR107 play an important role at this point, the network being referred to as a "snubber" circuit. The inductance of the primary windings P1 and P2 of transformer T1, together with the capacitor C110 and resistors provide a simple LC delay line, having a predetermined delay of 500 nanoseconds in this preferred embodiment, an ample time period to turn off transistor Q7.

At the end of the delay, the primary field collapses, causing the flyback voltage to rise to a level higher than the 300 volt supply, approximately 156 volts in this preferred embodiment, driving the current through the primary windings P1 and P2 in a direction opposite to that of the energy storage cycle. Diodes CR10, CR15, CR113, and CR13 in each of the secondary windings (FIG. 4) permit current to flow, truncating the flyback voltage for a time period required to charge up the four terminal secondary capacitors C12-C15. At that time, the voltage across the primary windings of T1 begins an exponential decay back to 300 volts. The "snubber" circuit provides the parameters for desired exponential decay.

During the energy transfer cycle, flyback protect capacitor C101 begins to charge. If for some reason, the flyback voltage becomes excessively high, the charge on capacitor C101 rises to the point where the voltage presented on the base of transistor Q14A turns that transistor on, providing base drive to transistor Q14B, also turning that transistor on. When transistor Q14B conducts, the voltage across the combination of resistors R105 and R106 drops to nearly zero, as described earlier. This removes the base drive to power driver transistor Q7, turning that transistor off, which also turns off the power switch transistor Q8. Thus, there can be no further energy storage cycle until the flyback protect capacitor C101 discharges sufficiently through the combination of resistors R124 and R125 to cut off transistor Q14A which turns off transistor Q14B, thereby enabling the circuit to again resume normal functioning.

The Secondary Circuit

Secondary winding S2-1 is connected at one end to terminal E16 and to one side of four terminal capacitor C15 as shown in FIG. 4. The other side of secondary winding S2-1 is connected to the cathode of diode CR10, whose anode is connected to the other side of four terminal capacitor C15. Also connected to the other side of capacitor C15 is output terminal 13 on which is carried a negative 12 volts. The one side of capacitor C15 has another connection to ground.

Transformer secondary winding S2-2 has one end connected to terminal E10 and to the anode of diode CR15, whose cathode is connected to one side of four terminal capacitor C14, the one side of capacitor C14 having another connection made to terminal 12 which is an output terminal for a positive 12 volts. One connection on the other side of capacitor C14 is made to terminal E16 and a second connection on the other side of capacitor C14 is made to ground. The other end of winding S2-2 is connected to one end of secondary winding S2-3 and to the anode of diode CR113, whose cathode is connected to one side of four terminal capacitor C13. A second connection is made to the one side of capacitor C13 to one end of resistor R37, whose other end is connected to terminal 14 which carries a positive 5 volts. The other side of capacitor C13 has one connection to terminal E16, and another connection to terminal 25 which connects to a fault circuit to be described later and also to the other end of transformer secondary S2-3.

Secondary winding S1 is connected at one end to the anode of diode CR13, whose cathode is connected to one side of four terminal capacitor C12. The other side of winding S1 is connected to terminal E10. The second connection to the one side of capacitor C12 is made to terminal 9, on which a positive 30 volts is carried and to one end of resistor R159, whose other end is connected to ground. A first connection on the other side of capacitor C12 is made to terminal E16 and to capacitor C69, whose other side is connected to ground. The second connection on the other side of capacitor C12 is made to ground.

Terminal 27 is connected to the collector of Q36, a photo transistor (FIG. 2) and through resistor R44 to the base of PNP transistor Q3A. The base of transistor Q3A is tied to terminal 14 through resistor R43. Capacitor C108 is connected to the base of transistor Q3A at one terminal and to ground at the other. The emitter of transistor Q3A is connected to one end of resistors R45 and R48 respectively and to one terminal of capacitor C17, whose other terminal is connected to ground. The other side of resistor R45 is tied to terminal 29, which in turn is tied to one end of resistor R23, whose other end is connected to terminal 12. The collector of transistor Q3A is connected to ground. The other end of resistor R48 is connected to NPN transistor Q2B, one transistor of a Schmidt trigger circuit. The emitter of transistor Q2B is connected through resistor R50 to ground and is connected through resistor R51 to the emitter of NPN transistor Q2A, the other transistor of the Schmidt trigger circuit. The emitter of transistor Q2A is also connected to ground through resistor R53. The collector of transistor Q2B is connected through resistor R49 to terminal 29. The collector of transistor Q2A is also connected to terminal 29 through resistor R52. The collector of transistor Q2B is also connected to the emitter of transistor Q3C, which is part of a self-starting circuit. The collector of transistor Q3C is connected through resistor R54 to the base of transistor Q2A, through resistor R55 to variable resistor R144, whose other end is connected to ground, and through resistor R58 to the collector of PNP transistor Q1A. The base of transistor Q3C is connected through resistor R56 to ground, and also connected through resistor R57 to the collector of transistor Q3D. Transistors Q3C and Q3D are both part of the self-starting circuit. The emitter of transistor Q3D is connected to terminal 29 and its base is connected to its emitter through resistor R27. The base of transistor Q3D is also connected through resistor R26 and through resistor R25 to the base of transistor Q1D. The base of transistor Q1D is connected through resistor R61 to the emitter of transistor Q3D. The emitter of transistor Q1D is connected to the collector of transistor Q2A. The collector of transistor Q1D is connected to ground through resistor R59 and is also connected to the base of transistor Q2C through resistor R60. The collector of transistor Q1A is also connected to the cathode of Zener diode CR9, whose anode is connected to ground. Capacitor C18 is connected across Zener diode CR9. The base of transistor Q1A is connected to ground through resistor R65 and is connected to the collector of transistor Q1B. The base of transistor Q1A is also connected to one terminal of capacitor C41, whose other terminal is connected to the base of transistor Q1B. The emitter of transistor Q1B is connected to terminal 29. The base of transistor Q1B is also connected through resistor R145 to the emitter of transistor Q1A and through resistor R64 to terminal 29.

Finally, the emitter of transistor Q2C is connected to ground and its collector is connected through R62 to terminal 28. Resistor R127 is connected between terminal 29 and terminal 28.

Preferred Mode of Operation of the Secondary Circuit

Referring first to FIG. 2, at the end of the energy transfer cycle, transistor Q6B is turned off. With that transistor turned off, the current path for the light emitting diode CR36 is broken, thus cutting off diode CR36. With that diode turned off, phototransistor Q36 also turns off and presents an open collector to terminal 27. This is a regulation cycle start (RCS) signal. This signal then is presented at terminal 27 of FIG. 4, interrupting the current flow through resistors R43 and R44 and thereby causing the potential on the base of PNP transistor Q3A to become more positive, cutting off that transistor. With transistor Q3A turned off, ramp capacitor C17 will begin charging from current flow through resistor R45. When the positively oriented voltage across C17 reaches a predetermined threshold, the Schmidt trigger transistor Q2B is turned on. In the preferred embodiment, the Schmidt trigger is set to trigger at 5 volts, and this is accomplished by placing a reference voltage on the base of the other transistor in the trigger circuit, Q2A. The reference voltage is applied from transistor Q1A, which is turned on when power is applied, conducting current through resistor R64 and Zener diode CR9. When sufficient current flows through resistor R64 to cause approximately 0.6 volts drop to be developed across that resistor, transistor Q1B turns on. The effect is to attempt to turn off transistor Q1A, thereby reducing the current flow through resistor R64. As the voltage developed across resistor R64 drops below 0.6 volts, transistor Q1B attempts to turn off, and transistor Q1A then attempts to turn on. Capacitor C41 provides stablization for this feedback circuit, which provides current through resistor R58, developing a reference voltage at the base of Schmidt trigger transistor Q2A. Therefore, when transistor Q2B conducts current through resistor R49, transistor Q3C is cut off and as the current develops through resistor R49, ultimately transistor Q2A will also be cut off, depending of course on the reference voltage. The amplitude of cut off is the same in each case, but the time of cut off is different. This circuit providing the reference voltage and the Schmidt trigger is an amplitude-to-pulse-width-converter circuit. When, for example, the +5 volt secondary supply provided at terminal 14 is high, then the voltage at the base of Q3A is high. Consequently, the ramp capacitor C17 does not have to be charged as much to reach the threshold of the Schmidt trigger and therefore that threshold is reached in a shorter time. If the voltage is low, it takes longer to reach the threshold.

With Schmidt trigger transistor Q2A turned off, transistor Q1D turns on.

The conduction of transistor Q1D provides base drive to transistor Q2C, turning that transistor on. Current is then conducted through the transistor Q2C and through light emitting diode Q37 of FIG. 2, which turns on phototransistor Q37. This is the regulation cycle end (RCE) signal. This terminates the energy storage cycle by turning on transistor Q9. The storage is terminated early if the 5 volt supply was too high and an RCE signal was received before the normal time-out of the clock circuit.

Referring again to FIG. 4, the combination of transistors Q3C and Q3D, with associated circuitry, provide a positive self-starting circuit. The purpose is to prevent a lock up of the circuit in the event that the voltage as initially applied is too low. It is desired to preclude any false RCE signal to be sent back to the primary. Transistor Q3C is normally turned on, which keeps Schmidt trigger transistor Q2A turned on, when power is initially applied. When transistor Q2A is conducting, transistor Q1D is turned off. It will not turn on until transistor Q3D conducts and transistor Q3D will not begin conduction until the drop across R27 is sufficient to cause conduction. The voltage across R27 will not be sufficient to cause conduction of Q3D until the secondary voltage has come up to its operating potential. This potential is maintained by Zener diode CR19. Until transistor Q3D conducts then, transistor Q2C is cut off and therefore no RCE signal can be sent back to the primary.

Protection Circuits

Referring again to FIG. 4, transistor Q15 is shown with its emitter connected to terminal 25, its collector connected to terminal 14, the 5 volt supply, and its base connected through resistor R36 to terminal 25. Zener diode CR17 is connected from the base of transistor Q15 to its collector.

If, for some reason, a high voltage were imposed on the +5 volt secondary supply, the TTL logic used in this preferred embodiment would be endangered. Transistor Q15 is a power transistor connected directly across the +5 volts. Should the voltage rise above approximately 5.7 volts, transistor Q15 will turn on. The threshold is set by the Zener diode CR17 which is nominally a 5.1 volt Zener and the value of resistor R36 is selected so that the Zener has to be biased so that is has sufficient current flowing through it to preclude transistor Q15 from falsely turning on. When the Zener CR17 has sufficient current through it to develop approximately 0.6 volts across resistor R36, then transistor Q15 turns on, keeping the 5 volt supply clamped at 5 volts until a fuse opens. This circuit is known as a crowbar circuit.

Another protection circuit is comprised of Zener diode CR114, whose anode is connected to ground and whose cathode is connected through resistor R28 to terminal 14, the 5 volt supply, and transistor Q1C which has its base connected through resistor R126 to the cathode of Zener diode CR114 and also through resistor R39 to ground. The emitter of transistor Q1C is connected through resistor R37 to terminal 14 and the collector is connected through resistor R47 to terminal 30, which in turn is connected to the anode of light emitting diode CR38 which couples to the primary circuit through phototransistor Q38, shown in FIG. 2.

When transistor Q15 has been turned on, indicating an over-voltage case, or if the 5 volt secondary supply is shorted to ground, then transistor Q1C turns on, causing current to be conducted through resistor R47. In the case of a short in the 5 volt secondary supply, that also turns on transistor Q1C when approximately 0.3 volts is developed across R37. Therefore, transistor Q1C is set up to react to either an over-voltage situation or an over-current situation. In either case, referring to FIG. 2, when transistor Q38 is turned on, it actuates a primary latch circuit which is comprised of transistors Q6A and Q10, and associated circuitry, including diode CR110. The emitter of transistor Q38 is tied to terminal 22, its collector is connected to the collector of transistor Q6A, to the base of transistor Q10 and through resistor R122, resistor R121, to the cathode of diode CR110, whose anode is connected through resistor R100 to the base of transistor Q9. The emitter of transistor Q10 is connected to the junction between resistors R121 and R122, and also through resistor R120 to the anode of Zener diode CR8. The emitter of transistor Q6A is connected to terminal 22. The collector of transistor Q10 is connected to the base of transistor Q6A and through resistor R123 to terminal 22. By-pass capacitor C16 is connected in parallel with resistor R123.

When phototransistor Q38 conducts by reason of emission of light from light emitting diode CR38, current is conducted through diode CR10, resistor R121, and resistor R122, causing transistor Q10 to turn on and which in turn causes transistor Q6A to turn on, thereby stopping any further regulation cycles.

General Operation

Figure 5:
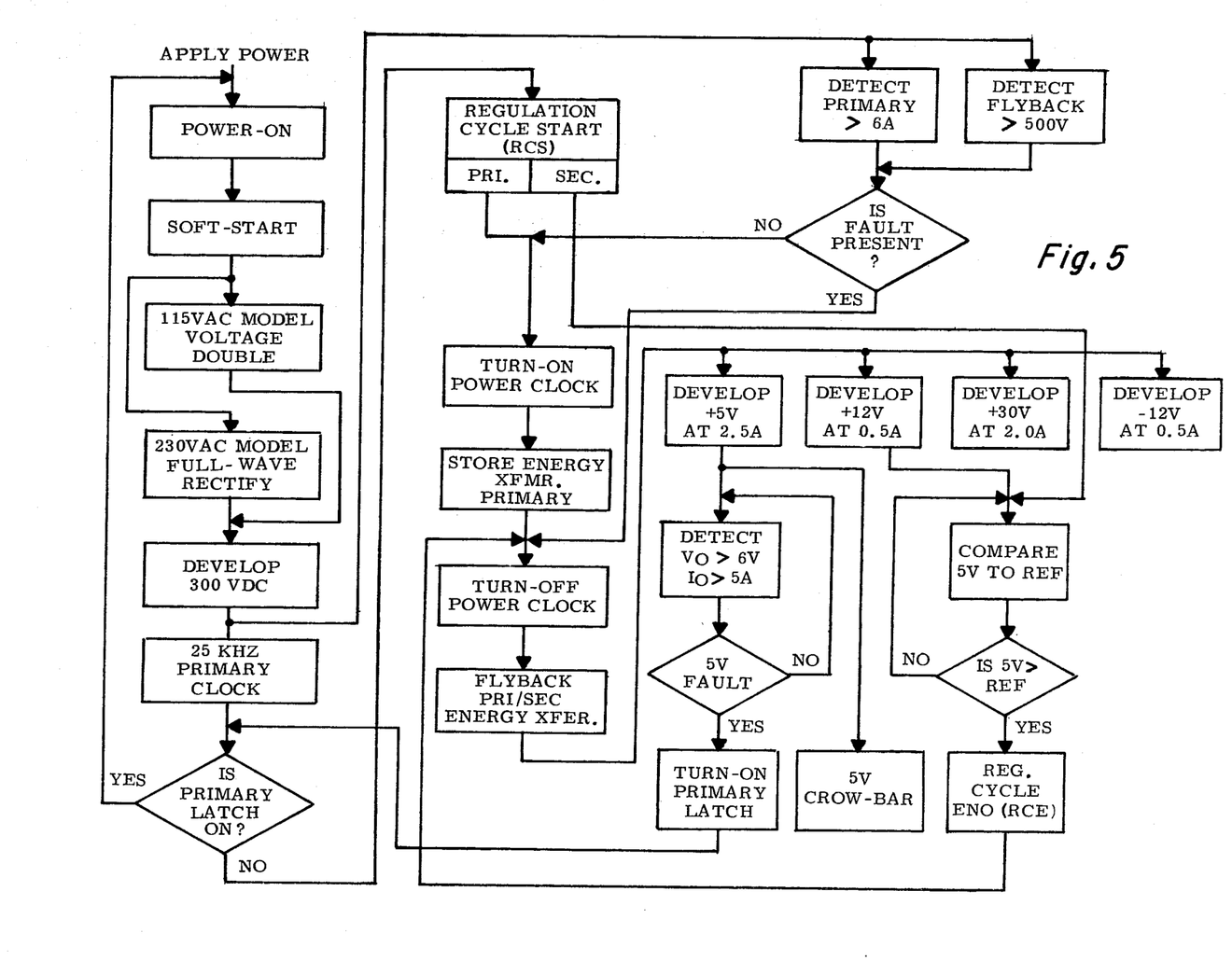
FIG. 5 is a flow chart indicating the sequence of events in the operation of the power supply.

Referring now to FIG. 5, the operation of the power supply of this disclosure can be summarized. Starting at the left top of FIG. 5, the AC line power is applied to a soft-start circuit. In this preferred embodiment, the soft-start circuit is the subject of a co-pending patent application, Ser. No. 482,388, entitled "Electronic Variac Surge Current Limiting Circuit", Filed June 24, 1974, and assigned to the assignee of this invention. The purpose is to avoid the sudden application of the full AC line voltage. The voltage is then doubled, if required, to provide, ultimately, 300 volts DC. 300 volts DC is applied to the 25 KHz primary clock. At this point, if the primary latch is on, then power must be reapplied. If it is not, the regulation cycle start (RCS) is activated. If the primary current or flyback voltage is excessive, then the power clock transistor Q4 is not turned on. Otherwise, it is turned on and the energy storage cycle occurs followed by the turning off of the power clock. Then the energy transfer is caused by the flyback of transformer T1. The secondary voltages are developed and the fault circuits check to determine if the secondary voltage is too high, or if the current is too high, in which case the primary latch is turned on. If the 5 volt secondary supply is excessive, the 5 volt crowbar circuit is turned on. The 5 volt secondary is compared to a reference and if it is too high, the regulation cycle ends the energy storage cycle earlier than normal. All communication between primary and secondary, except for the actual energy transfer, is performed by DC devices in the form of opto-couplers. Having described the invention in connection with this preferred embodiment, it is to be understood that further modifications may now suggest themselves to those skilled in the art and such modifications are intended to be covered by this disclosure.

What is claimed is:

1. A switching regulator power supply for connection to a DC source of rectified AC power with a regulation cycle having an energy storage cycle and an energy transfer cycle, comprising:
   a. timing means, for continuously providing a predetermined time period for the energy storage and a predetermined time period for the energy transfer cycle;
   b. power switching means, connected to one side of the DC source and connected to the timing means to close and provide power during the energy storage cycle and to open during the energy transfer cycle;
   c. a transformer having a primary winding with one end connected to the other side of the DC source and the other end connected to the power switching means to permit current to flow in one direction during the energy storage cycle and in the other direction during the energy transfer cycle and at least one secondary winding biased to permit current flow only during the energy transfer cycle;
   d. indicating means operatively connected to the secondary winding to provide electrical signals indicative of secondary electrical power parameters the electrical signals including an end regulation cycle signal; and
   e. first direct current coupling means, connected to the indicating means and to the timing means to couple the RCE signal to the timing means, the timing means being responsive to the RCE signal for adjusting the time of the energy storage cycle to a finite time more than zero.

2. The power supply of claim 1 wherein the first direct current coupling means are an opto-coupler, having a light emitting device connected to the output of the indicating means and a light responsive device connected to the timing means.

3. The power supply of claim 2 wherein the timing means further comprise a one-shot multivibrator circuit, a triggering circuit for providing a repetitive triggering signal to the one-shot multivibrator at predetermined time intervals and an ouput circuit for providing an output timing signal.

4. The power supply of claim 3 wherein the transformer has a plurality of secondary windings, each secondary winding having a unidirectional current conducting device oriented to prevent current flow during the energy storage cycle and to permit current flow during the energy transfer cycle.

5. The power supply of claim 1 wherein the timing means further comprise a one-shot multivibrator circuit, a triggering circuit for providing a repetitive triggering signal to the one-shot multivibrator at predetermined time intervals and an output circuit for providing an output timing signal.

6. The power supply of claim 1 wherein the transformer has a plurality of secondary windings, each secondary winding having a unidirectional current conducting device oriented to prevent current flow during the energy storage cycle and to permit current flow during the energy transfer cycle.

7. The power supply of claim 6 wherein one of the plurality of secondary windings is connected to the indicating means.

8. A switching regulator power supply for connection to a DC source of rectified AC power with a regulation cycle having an energy storage cycle and an energy transfer cycle, comprising:
   a. timing means, for providing a predetermined time period for the energy storage cycle and a predetermined time period for the energy transfer cycle;
   b. i. a power drive transistor and a power switching transistor connectedd together in a Darlington configuration, the power switching transistor being connected to the transformer primary winding for closing and providing power during the energy storage cycle and for opening during the energy transfer cycle; and
      ii. a power clock transistor for providing the base drive to the power driver transistor and connected to provide a voltage input to the timing means;
   c. a transformer having a primary winding with one end connected to the other side of the DC source and the other end connected to the power switching transistor to permit current to flow in one direction during the energy storage cycle and in the other direction during the energy transfer cycle and at least one secondary winding biased to permit current flow only during the energy transfer cycle;
   d. indicating means, operatively connected to the secondary winding to provide electrical signals indicative of secondary electrical power parameters, the electrical signals including an end regulation cycle (REC) signal; and
   e. first direct current coupling means, connected to the indicating means and to the timing means to couple the RCE signal to the timing means, the timing means being responsive to the RCE signal for adjusting the time of the energy storage cycle.

9. A switching regulator power supply for connection to a DC surce of rectified AC power with a regulation cycle having an energy storage cycle and an energy transfer cycle, comprising:
   a. timing means including a one-shot multivibrator circuit, a triggering circuit for providing a repetitive triggering signal to the one-shot multivibrator at predetermined time intervals and an output circuit for providing an output timing signal for providing a predetermined time period for the energy transfer cycle;
   b. i. a power driver transistor and a power switching transistor connected together in a Darlington configuration, the power switching transistor being connected to the transformer primary winding for closing and providing power during the energy storage cycle and for opening during the energy transfer cycle; and
      ii. a power clock transistor for providing the base drive to the power driver transistor and connected to provide a voltage input to the timing means;

c. a transformer having a primary winding with one end connected to the other side of the DC source and the other end connected to the power switching transistor to permit current to flow in one direction during the energy storage cycle and in the other direction during the energy transfer cycle, and a plurality of secondary windings, each secondary winding having a unidirectional current conducting device oriented to prevent current flow during the energy storage cycle and to permit current flow during the energy transfer cycle;

d. indicating means, operatively connected to the secondary winding to provide electrical signals indicative of secondary electrical power parameters, the electrical signals including an end regulation cycle (REC) signal; and e. an opto-coupler, having a light emitting device connected to the output of the indicating means and a light responsive device connected to the timing means to couple the RCE signal to the timing means, the timing means being responsive to the RCE signal for adjusting the time of the energy storage cycle.

10. The power supply of claim 9 further comprising:

f. a self-start circuit connected across a selected one of the secondary windings and operatively connected to said indicating means to prevent an RCE signal until the voltage across the selected winding rises to a predetermined value.

11. A switching regulator power supply for connection to a DC source of rectified AC power with a regulation cycle having an energy storage cycle and an energy transfer cycle, comprising:

a. timing means, for providing a predetermined time period for the energy storage cycle and a predetermined time period for the energy transfer cycle;

b. power switching means, connected to one side of the DC source and connected to the timing means to close and provide power during the energy storage cycle and to open during the energy transfer cycle;

c. a transformer having a primary winding with one end connected to the other side of the DC source and the other end connected to the power switching means to permit current to flow in one direction during the energy storage cycle and in the other direction during the energy transfer cycle and at least one secondary winding biased to permit current flow only during the energy transfer cycle;

d. indicating means, operatively connected to the secondary winding to provide electrical signals indicative of secondary electrical power parameters, the electrical signals including an end regulation cycle (RCE) signal;

e. first direct current coupling means, connected to the indicating means and to the timing means to couple the RCE signal to the iming means, the timing means being responsive to the RCE signal for adjusting the time of the energy storage cycle; and f. second direct current coupling means, connected to and responsive to the timing means and connected to the secondary circuit for providing to the indicating means regulaton cycle start (RCS) signal.

12. The power supply of claim 11 wherein the timing means further comprise a one-shot multivibrator circuit a triggering circuit for providing a repetitive triggering signal to the one-shot multivibrator at predetermined time intervals and an output circuit for providing an output timing signal.

13. The power supply of claim 11 wherein the indicating means comprise:

d. i. a first Schmidt trigger circut having input means responsive to the RCS signal and connected to receive the voltage from the secondary winding:

ii. a reference voltage generating circuit; and iii. a comparison circuit connected to the first Schmidt trigger circuit and to the reference voltage generating circuit for providing the RCE signal.

14. The power supply of claim 11, further comprising:

g. a protection circuit, connected to the indicating means for sensing excessive voltage and excessive current and for providing a signal indicative of excessive voltage or excessive current;

h. a primary latch circut, connected to the output of said timing means to inhibit output from the timing circuit when the primary latch circuit is activated; and i. third direct current coupling means connected from the protection circuit to the primary latch circuit to activate the primary latch circuit in the presence of a signal indicative of excessive voltage or excessive current.

15. The power supply of claim 14 wherein the indicating means comprise:

d. i. a first Schmidt trigger circuit having input means responsive to the RCS signal and connected to receive the voltage from the secondary winding;

ii. a reference voltage generating circuit; and iii. a comparison circuit connected to the first Schmidt trigger circuit and to the reference voltage generating circuit for providing the RCE signal.

16. The power supply of claim 14 wherein the third direct coupling means are an opto-coupler having a light emitting device connected to the protection circuit and a light responsive device connected to the primary latch circuit.

17. The power supply of claim 16 wherein the timing means further comprise a one-shot multivibrator circuit, a triggering circuit for providing a repetitive triggering signal to the one-shot multivibrator at predetermined time intervals and an output circuit for providing an output timing signal.

18. The power supply of claim 14 wherein the timing means further comprise a one-shot multivibrator circuit, a triggering circuit for providing a repetitive triggering signal to the one-shot multivibrator at predetermined time intervals and an output circuit for providing an output timing signal.

19. The power supply of claim 18 wherein the first direct current coupling means are an opto coupler, having a light emitting device connected to the output of the indicating means and a light responsive device connected to the timing means.

20. The power supply of claim 19 wherein the second direct current coupling means are an opto coupler having a light emitting device connected to the clock circuit and a light responsive device connected to the input of the indicating means.

21. The power supply of claim 20 wherein the third direct coupling means are an opto coupler having a light emitting device connected to the protection circuit and a light responsive device connected to the primary latch circuit.

22. The power supply of claim 21 wherein the power switching means comprise:
b. i. a power driver transistor and a power switching transistor connected together in a Darlington configuration, the power switching transistor being connected to the transformer primary winding; and
ii. a power clock transistor for providing the base drive to the power driver transistor and connected to provide a voltage input to the one-shot multivibrator circuit and the triggering circuit.

23. The power supply of claim 22 wherein the transformer has a plurality of secondary windings, each secondary winding having a unidirectional current conducting device oriented to prevent current flow during the energy storage cycle and to permit current flow during the energy transfer cycle.

24. The power supply of claim 23 wherein one of the plurality of secondary windings is connected to the indicating means.

25. The power supply of claim 24 wherein the indicating means comprise:
d. i. a first Schmidt trigger circuit having input means responsive to the RCS signal and connected to receive the voltage from the secondary winding;
ii. a reference voltage generating circuit; and
iii. a comparison circuit connected to the first Schmidt trigger circuit and to the reference voltage generating circuit for providing the RCE signal.

26. The power supply of claim 25 further comprising:
k. a self-start circuit connected across a selected one of the secondary windings and operatively connected to the comparison circuit to prevent an RCE signal until the voltage across the selected winding rises to a predetermined value.

27. The power supply of claim 11 wherein the second direct current coupling means are an opto-coupler having a light emitting device connected to the clock circuit and a light responsive device connected to the input of the indicating means.

28. The power supply of claim 27 wherein the timing means further comprise a one-shot multivibrator circuit, a triggering circuit for providing a repetitive triggering signal to the one-shot multivibrator at predetermined time intervals and an output circuit for providing an output timing signal.

29. The power supply of claim 28 wherein the transformer has a plurality of secondary windings, each secondary winding having a unidirectional current conducting device oriented to prevent current flow during the energy storage cycle and to permit current flow during the energy transfer cycle.

30. The power supply of claim 29 wherein one of the plurality of secondary windings is connected to the indicating means.

31. The power supply of claim 30 wherein the power switching means comprise:
b. i. a power driver transistor and a power switching transistor connected together in a Darlington configuration, the power switching transistor being connected to the transformer primary winding; and
ii. a power clock transistor for providing the base drive to the power driver transistor and connected to provide a voltage input to the one-shot multivibrator circuit and the triggering circuit.

32. The power supply of claim 31 wherein the first direct current coupling means are an opto coupler, having a light emitting device connected to the output of the indicating means and a light responsive device connected to the timing means.

33. The power supply of claim 32 wherein the indicating means comprise:
d. i. a first Schmidt trigger circuit having input means responsive to the RCS signal and connected to receive the voltage from the secondary winding;
ii. a reference voltage generating circuit; and
iii. a comparison circuit connected to the first Schmidt trigger circuit and to the reference voltage generating circuit for providing the RCE signal.

34. The power supply of claim 33 further comprising:
g. a self-start circuit connected across a selected one of the secondary windings and operatively connected to the comparison circuit to prevent an RCE signal until the voltage across the selected winding rises to a predetermined value.

35. A switching regulator power supply for connection to a DC source of rectified AC power, with a regulation cycle having an energy storage cycle and an energy transfer cycle, comprising:
a. timing means, for providing a predetermined time period for the energy storage cycle and a predetermined time period for the energy transfer cycle;
b. power switching means, connected to one side of the DC source and connected to the timing means to close and provide power during the energy storage cycle and to open during the energy transfer cycle;
c. a transformer, having a primary winding with one end connected to the other side of the DC source and the other end connected to the power switching means to permit current to flow in one direction during the energy storage cycle and in the other direction during the energy transfer cycle and at least one secondary winding biased to permit current flow only during the energy transfer cycle;
d. indicating means, operatively connected to the secondary winding to provide electrical signals indicative of secondary electrical power parameters; and
e. direct current coupling means, connected to and responsive to said timing means and connected to the secondary circuit for providing to said indicating means a regulation cycle start (RCS) signal.

36. The power supply of claim 35 wherein the direct current coupling means are an opto-coupler having a light emitting device connected to the clock circuit and a light responsive device connected to the input of the indicating means.

37. A switching regulator power supply for connection to a DC source of rectified AC power with a regulation cycle having an energy storage cycle and an energy transfer cycle, comprising:

a. timing means, for continuously providing a predetermined time period for the energy storage cycle and a predetermined time period for the energy transfer cycle;
b. power switching means, connected to one side of the DC souce and connected to the timing means to close and provide power during the energy storage cycle and to open during the energy transfer cycle;
c. a transformer, having a primary winding with one end connected to the other side of the DC source and the other end connected to the power switching means to permit current to flow in one direction during the energy storage cycle and in the other direction during the energy transfer cycle and at least one secondary winding biased to permit current flow only during the energy transfer cycle;
d. indicating means, operatively connected to the secondary winding to provide electrical signals indicative of secondary electrical power parameters, the electrical signal including an end regulation cycle (RCE) signal;
e. a protection circuit, connected to the indicating means for sensing excessive voltage and excessive current and for providing a signal indicative of excessive voltage or excessive current;
f. a primary latch circuit, connected to the output of the timing circuit to inhibit output from the timing circuit when the primary latch circuit is activated; and
g. direct current coupling means connected from the protection circuit to the primary latch circuit to activate the primary latch circuit in the presence of the signal indicative of excessive voltage or excessive current.

38. The power supply of claim 37 wherein the direct coupling means are an opto-coupler having a light emitting device connected to the protection and a light responsive device connected to the primary latch circuit.

39. A method of providing a regulated voltage from a DC source, comprising the steps of:
a. connecting the primary windings of a transformer across the DC source for a predetermined time, always providing an energy storage cycle of a finite time more than zero;
b. biasing the secondary windings of the transformer to prevent current flow during the energy storage cycle;
c. removing the primary windings of the transformer from the DC source for a predetermined time;
d. providing a current path for opposite current flow when the primary windings are removed from the DC source, enabling an energy transfer cycle;
e. permitting current flow in the secondary windings of the transformer during the energy transfer cycle;
f. monitoring the secondary windings induced voltage and providing a signal (RCE) if the voltage is higher than a predetermined value; and
g. DC coupling the RCE signal through an opto-coupler to end the energy storage cycle.

* * * * *

Disclaimer and Dedication 4,001,663.—*William E. Bray*, Houston, Tex. SWITCHING REGULATOR POWER SUPPLY. Patent dated Jan. 4, 1977. Disclaimer and Dedication filed Jan. 26, 1984, by the assignee, *Texas Instruments, Inc.*

Hereby disclaims and dedicates to the Public claims 1–39 of said patent.

[*Official Gazette May 15, 1984.*]